United States Patent
Kumar et al.

(10) Patent No.: US 8,246,817 B2
(45) Date of Patent: Aug. 21, 2012

(54) DEIONIZATION FILTER FOR FUEL CELL VEHICLE COOLANT

(75) Inventors: Mukesh Kumar, Canton, MI (US); George Shih, Dearborn, MI (US); Stephen Fan, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/865,137

(22) Filed: Jun. 10, 2004

(65) Prior Publication Data

US 2005/0274676 A1    Dec. 15, 2005

(51) Int. Cl.
*C02F 1/42* (2006.01)
*H01M 8/04* (2006.01)
*B01D 35/02* (2006.01)
*B01D 35/143* (2006.01)

(52) U.S. Cl. ............ 210/85; 210/167.01; 210/171; 210/181; 210/196; 210/251; 210/287; 210/290; 210/416.1; 210/681; 210/746; 429/90; 429/428; 429/437

(58) Field of Classification Search .......... 210/662, 210/663, 669, 685, 686, 85, 93, 96.1, 259, 210/266, 282
See application file for complete search history.

(56) References Cited

U.S. PATENT DOCUMENTS

| | | | | |
|---|---|---|---|---|
| 2,938,868 A | * | 5/1960 | Carlson et al. | 210/662 |
| 3,838,774 A | * | 10/1974 | Dolan et al. | 210/85 |
| 3,909,402 A | * | 9/1975 | Gartner | 210/669 |
| 3,964,999 A | * | 6/1976 | Chisdes | 210/651 |
| 4,120,787 A | * | 10/1978 | Yargeau | 210/664 |
| 4,344,849 A | * | 8/1982 | Grasso et al. | 210/662 |
| 4,491,798 A | * | 1/1985 | Palmer et al. | 324/425 |
| 4,563,272 A | * | 1/1986 | Yoshida et al. | 210/93 |
| 5,200,278 A | * | 4/1993 | Watkins et al. | 429/413 |
| 5,344,721 A | * | 9/1994 | Sonai et al. | 429/423 |
| 5,980,716 A | * | 11/1999 | Horinouchi et al. | 204/524 |
| 6,186,254 B1 | | 2/2001 | Mufford et al. | 180/65.3 |
| 6,207,308 B1 | * | 3/2001 | Grasso et al. | 429/413 |
| 6,316,134 B1 | | 11/2001 | Cownden et al. | 429/19 |
| 6,406,810 B1 | * | 6/2002 | Konrad et al. | 429/415 |
| 6,416,892 B1 | | 7/2002 | Breault | 429/13 |
| 6,558,826 B1 | | 5/2003 | Walsh | 429/17 |
| 6,569,298 B2 | | 5/2003 | Merida-Donis | |

(Continued)

FOREIGN PATENT DOCUMENTS

DE    3533098 A1 *  3/1987

OTHER PUBLICATIONS

German PTO Office Action Aug. 8, 2006.

*Primary Examiner* — Robert James Popovics
(74) *Attorney, Agent, or Firm* — Damian Porcari, Esq.; Tung & Associates

(57) ABSTRACT

A novel deionization filter for removing ions from a coolant in an electric fuel cell vehicle cooling system is disclosed. The deionization filter includes a filter housing having a coolant inlet port, through which the coolant enters the filter housing; and a coolant outlet port, through which the coolant exits the filter housing. An ion exchange bed having positively-charged and negatively-charged ion exchange resin beads is provided in the filter housing for removing negative and positive ions, respectively, from the coolant. At least one filter assembly is typically provided in the filter housing for filtering particles from the coolant.

4 Claims, 2 Drawing Sheets

U.S. PATENT DOCUMENTS

| | | | |
|---|---|---|---|
| 6,692,854 B2* | 2/2004 | Misumi | 429/26 |
| 6,709,779 B2* | 3/2004 | Uozumi | 429/24 |
| 6,723,460 B2* | 4/2004 | Derflinger et al. | 429/13 |
| 6,855,445 B2* | 2/2005 | Mueller et al. | 429/410 |
| 7,052,790 B2* | 5/2006 | Nakamura et al. | 429/26 |
| 7,097,763 B2* | 8/2006 | Takemoto et al. | 210/130 |
| 7,191,858 B2* | 3/2007 | Vanderwees et al. | 180/65.31 |
| 7,261,816 B2* | 8/2007 | Suzuki et al. | 210/282 |
| 7,329,348 B2* | 2/2008 | Curello et al. | 210/251 |
| 7,395,854 B2* | 7/2008 | Schmidt et al. | 165/287 |
| 7,422,811 B2* | 9/2008 | Yasumoto et al. | 429/22 |
| 7,434,411 B2* | 10/2008 | Drost et al. | 62/101 |
| 7,442,454 B2* | 10/2008 | Wakabayashi | 429/22 |
| 7,445,705 B2* | 11/2008 | Kumar et al. | 210/90 |
| 7,635,427 B2* | 12/2009 | Suzuki et al. | 210/282 |
| 7,655,098 B2* | 2/2010 | Shih et al. | 134/169 A |
| 7,947,171 B2* | 5/2011 | Takemoto | 210/167.32 |
| 8,038,878 B2* | 10/2011 | Hewkin | 210/167.32 |
| 8,129,061 B2* | 3/2012 | Fujita | 429/437 |
| 2002/0076591 A1 | 6/2002 | Imaseki et al. | 429/26 |
| 2002/0164511 A1* | 11/2002 | Uozumi | 429/24 |
| 2002/0164512 A1* | 11/2002 | Grasso | 429/26 |
| 2003/0072981 A1 | 4/2003 | Imaseki et al. | 429/13 |
| 2003/0085135 A1* | 5/2003 | Andrews et al. | 205/637 |
| 2003/0129465 A1* | 7/2003 | Nakamura et al. | 429/26 |
| 2004/0028963 A1* | 2/2004 | Kormann et al. | 429/13 |
| 2004/0170877 A1* | 9/2004 | Wakabayashi | 429/22 |
| 2005/0019627 A1* | 1/2005 | Ozeki et al. | 429/20 |
| 2005/0058868 A1* | 3/2005 | Taga | 429/26 |
| 2005/0077252 A1* | 4/2005 | Shih et al. | 210/767 |
| 2005/0106433 A1* | 5/2005 | Takemoto | 429/24 |
| 2005/0115882 A1* | 6/2005 | Curello et al. | 210/263 |
| 2005/0115883 A1* | 6/2005 | Takemoto et al. | 210/282 |
| 2005/0115884 A1* | 6/2005 | Suzuki et al. | 210/282 |
| 2005/0274676 A1* | 12/2005 | Kumar et al. | 210/681 |
| 2006/0029851 A1* | 2/2006 | Santiago et al. | 429/30 |
| 2006/0051639 A1* | 3/2006 | Yang et al. | 429/26 |
| 2006/0057446 A1* | 3/2006 | Nishimura | 429/22 |
| 2006/0063050 A1* | 3/2006 | Yang et al. | 429/26 |
| 2006/0147772 A1* | 7/2006 | Takemoto | 429/24 |
| 2006/0204806 A1* | 9/2006 | Takada et al. | 429/26 |
| 2007/0020497 A1* | 1/2007 | Ryoichi et al. | 429/32 |
| 2007/0026267 A1* | 2/2007 | Paulus et al. | 429/13 |
| 2007/0119770 A1* | 5/2007 | Suzuki et al. | 210/282 |
| 2007/0137674 A1* | 6/2007 | Shih et al. | 134/22.1 |
| 2007/0259216 A1* | 11/2007 | Logan | 429/2 |
| 2007/0297470 A1* | 12/2007 | Kawashima et al. | 372/35 |
| 2008/0032168 A1* | 2/2008 | Fujita | 429/24 |
| 2008/0138712 A1* | 6/2008 | Suzuki | 429/247 |
| 2008/0311450 A1* | 12/2008 | Inoue | 429/22 |

* cited by examiner

US 8,246,817 B2

DEIONIZATION FILTER FOR FUEL CELL VEHICLE COOLANT

FIELD OF THE INVENTION

The present invention relates to cooling systems for an electric fuel cell vehicle. More particularly, the present invention relates to a deionization filter for removing ions from a liquid coolant in an electric fuel cell vehicle to lower the electrical conductivity of the coolant.

BACKGROUND OF THE INVENTION

Fuel cell technology has been identified as a potential alternative for the traditional internal-combustion engine conventionally used to power automobiles. It has been found that power cell plants are capable of achieving efficiencies as high as 55%, as compared to maximum efficiency of about 30% for internal combustion engines. Furthermore, fuel cell power plants produce zero tailpipe emissions and produce only heat and water as by-products.

Fuel cells include two basic components: an electrode and a Proton Exchange Membrane (PEM). Hydrogen fuel flows into one electrode which is coated with a catalyst that strips the hydrogen into electrons and protons. Protons pass through the PEM to the other electrode. Electrons cannot pass through the PEM and must travel through an external circuit, thereby producing electricity, which drives an electric motor that powers the automobile. Oxygen flows into the other electrode, where it combines with the hydrogen to produce water vapor, which is emitted from the tailpipe of the vehicle. Individual fuel cells can be stacked together in series to generate increasingly larger quantities of electricity.

While they are a promising development in automotive technology, fuel cells are characterized by a high operating temperature which presents a significant design challenge from the standpoint of maintaining the structural and operational integrity of the fuel cell stack. Maintaining the fuel cell stack within the temperature ranges that are required for optimum fuel cell operation depends on a highly-efficient cooling system which is suitable for the purpose.

Cooling systems for both the conventional internal combustion engine and the fuel cell system typically utilize a pump or pumps to circulate a coolant liquid through a network that is disposed in sufficient proximity to the system components to enable thermal exchange between the network and the components. Internal combustion engines use coolants that are high in electrical conductivity, typically having such constituents as water, ethylene glycol and additives such as corrosion inhibitors, pH adjustors and dyes. Fuel cell vehicles, in contrast, require a coolant which has a very low electrical conductivity since the coolant passes through the high-voltage fuel cell. Fuel cell vehicle coolants typically include a mixture of de-ionized water and ethylene glycol with no additives. The high conductivity which characterizes internal combustion engine coolants may cause short-circuiting if used in a fuel cell vehicle cooling system (FCVCS), leading to vehicle failure.

Due to the special low conductivity requirements of electric fuel cell vehicle cooling systems, a unique coolant having a low electrical conductivity is used in these systems. During circulation of the coolant throughout the fuel cell vehicle cooling system, however, ions are constantly leached from cooling system components such as plastic, metal and rubber hoses. Therefore, an ion-removing device is needed for removing ions from a coolant in a fuel cell vehicle cooling system in order to maintain low electrical conductivity of the coolant and prevent short-circuiting of the fuel cells which drive the vehicle.

SUMMARY OF THE INVENTION

The present invention is generally directed to a novel deionization filter for removing ions from a coolant in an electric fuel cell vehicle cooling system. The deionization filter typically includes a housing having a coolant inlet port and a coolant outlet port. A bed of negatively-charged cation and positively-charged anion exchange resin beads is contained in the housing, between the coolant inlet and outlet ports. The coolant is distributed from the vehicle cooling system and into the housing through the coolant inlet port, wherein the coolant trickles through the ion exchange resin bed. Accordingly, the positive ions in the coolant bind to the negatively-charged cation exchange beads and the negative ions in the coolant bind to the positively-charged anion exchange beads in the ion exchange resin bed. The coolant emerges from the coolant outlet port of the housing in a substantially ion-free condition and is returned to the cooling system. At least one filter assembly may be provided in the filter housing for filtering particles from the coolant.

BRIEF DESCRIPTION OF THE DRAWINGS

The invention will now be described, by way of example, with reference to the accompanying drawings, in which.

DETAILED DESCRIPTION OF THE INVENTION

The present invention contemplates a novel deionization filter for removing ions from a liquid coolant in a cooling system of an electric fuel cell vehicle. The deionization filter typically includes an elongated, cylindrical filter housing which includes a coolant inlet port, typically at the upper end of the housing, and a coolant outlet port, typically at the lower end of the housing. Between the coolant inlet port and the coolant outlet port, the housing contains an ion exchange resin bed having positively-charged anion exchange beads for binding negatively-charged anions in the coolant and negatively-charged cation exchange beads for binding positively-charged cations in the coolant.

Figure 1:
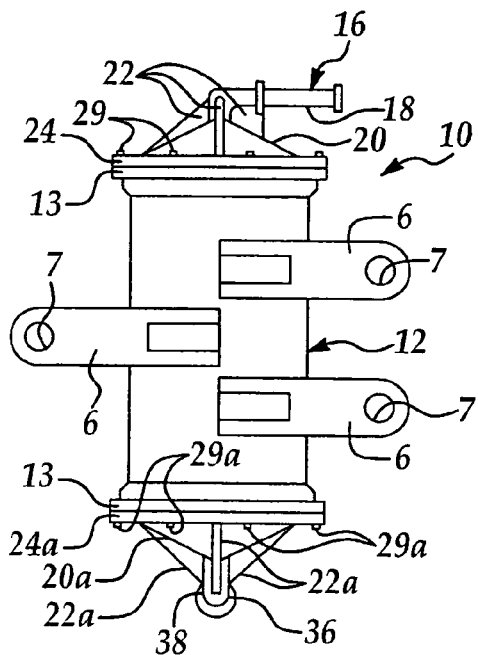
FIG. 1 is a front view of an illustrative embodiment of the deionization filter of the present invention.
Figure 2:
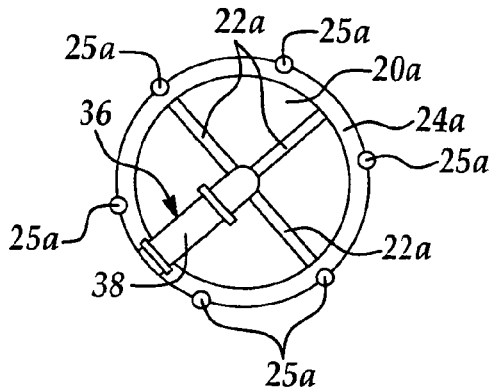
FIG. 2 is a bottom view of the deionization filter, more particularly illustrating a coolant outlet port of the filter.
Figure 3:
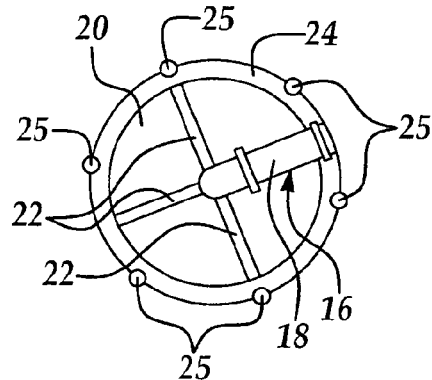
FIG. 3 is a top view of the deionization filter, more particularly illustrating a coolant inlet port of the filter.
Figure 4:
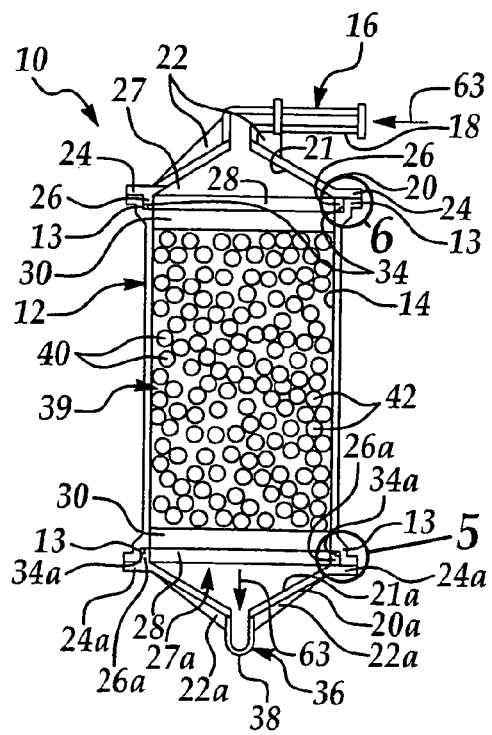
FIG. 4 is a longitudinal sectional view of the deionization filter, more particularly illustrating an ion exchange resin bed provided in the housing of the filter between the coolant inlet and outlet ports.

Referring initially to FIGS. 1-9, an illustrative embodiment of the deionization (DI) filter of the present invention is generally indicated by reference numeral 10. The DI filter 10 includes an elongated, typically cylindrical filter housing 12 which is typically a lightweight plastic material. The filter housing 12 is fitted with an outwardly-extending housing flange 13 at each end. As shown in FIG. 4, the filter housing 12 encloses a housing interior 14 which contains an ion exchange bed 39 including multiple negatively-charged cation exchange resin beads 40 and multiple positively-charged anion exchange resin beads 42, the purpose of which will be hereinafter described. Multiple filter mount brackets 6, each provided with a fastener opening 7, may extend from the filter housing 12 to facilitate mounting the DI filter 10 in a vehicle, as hereinafter described.

The upper end of the filter housing 12 is fitted with a coolant inlet port 16 which includes an inlet port end cap 20, a top view of which is shown in FIG. 3. The inlet port end cap 20 has an inlet port end cap interior 21, as shown in FIG. 4. The inlet port end cap 20 is circumscribed by an annular, outwardly-extending cap flange 24, from which the inlet port end cap 20 tapers upwardly. As further shown in FIG. 4, an annular seal flange 26 extends downwardly from the inner diameter of the cap flange 24.

An inlet conduit 18 is connected to the apex of the inlet port end cap 20 and is disposed in fluid communication with the inlet port end cap interior 21. Multiple ribs or gussets 22 may be provided between the upper surface of the inlet port end cap 20 and the inlet conduit 18 to stabilize the inlet conduit 18 on the coolant inlet port 16. As shown in FIG. 3, multiple bolt openings 25 are provided in the cap flange 24 to receive respective bolts 29 (FIG. 1) that mount the inlet port end cap 20 to the housing flange 13 at the upper end of the filter housing 12. As shown in the enlarged sectional view of FIG. 6, an annular O-ring groove 32 is typically provided in the outer surface of the annular seal flange 26 which extends from the inlet port end cap 20. An O-ring 34, which may be an ethylene propylene diene monomer (EPDM) O-ring, for example, is provided in the O-ring groove 32 to provide a liquid-tight seal between the seal flange 26 and the housing flange 13 at the upper end of the filter housing 12.

The lower end of the filter housing 12 is fitted with a coolant outlet port 36. The coolant outlet port 36 is similar in design to the coolant inlet port 16 and includes an outlet conduit 38 which is connected to the apex of a tapered outlet port end cap 20a. As shown in FIG. 4, the outlet conduit 38 is disposed in fluid communication with an outlet port end cap interior 21a. Like the inlet port end cap 20, the outlet port end cap 20a is circumscribed by an outwardly-extending, annular cap flange 24a. An annular seal flange 26a extends upwardly from the inner diameter of the cap flange 24a. Multiple ribs or gussets 22a may be provided between the exterior surface of the outlet port end cap 20a and the outlet conduit 38 to stabilize the outlet conduit 38 in the coolant outlet port 36. As shown in FIG. 2, multiple bolt openings 25a are provided in the cap flange 24a to receive respective bolts 29a (FIG. 1) that mount the inlet port end cap 20a to the housing flange 13 at the upper end of the filter housing 12.

Figure 5:
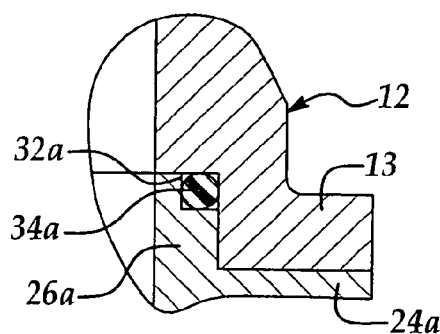
FIG. 5 is an enlarged sectional view, taken along section line 5 in FIG. 4.
Figure 6:
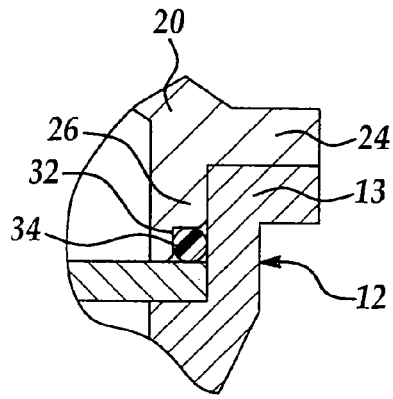
FIG. 6 is an enlarged sectional view, taken along section line 6 in FIG. 4.

As shown in the enlarged sectional view of FIG. 5, an annular O-ring groove 32a is typically provided in the outer surface of the annular seal flange 26a which extends from the outlet port end cap 20a. An O-ring 34a, which may be an ethylene propylene diene monomer (EPDM) O-ring, for example, is provided in the O-ring groove 32a to provide a liquid-tight seal between the seal flange 26a and the housing flange 13 at the bottom end of the filter housing 12.

As shown in FIG. 4, an upper filter assembly 27 and a lower filter assembly 27a are mounted in the respective upper and lower ends of the filter housing 12, according to the knowledge of those skilled in the art. The upper filter assembly 27 is provided between the inlet port end cap 20 and the ion exchange bed 39, whereas the lower filter assembly 27a is provided between the outlet port end cap 20a and the ion exchange bed 39. The upper filter assembly 27 and the lower filter assembly 27a may be substantially identical in construction.

Figure 7:
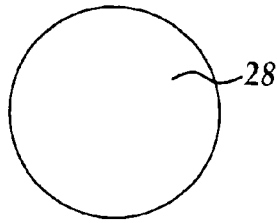
FIG. 7 is a top view of a stainless steel filter element of the deionization filter.
Figure 8:
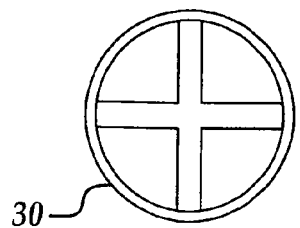
FIG. 8 is a top view of a nylon filter element of the deionization filter.
Figure 9:
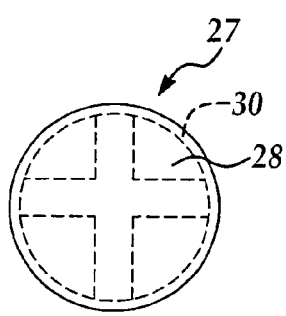
FIG. 9 is a top view of a filter assembly of the deionization filter element, which filter assembly includes the stainless steel filter element of FIG. 7 and the nylon filter element of FIG. 8.

As shown in FIGS. 7-9, the upper filter assembly 27 and lower filter assembly 27a each includes a typically stainless steel outer filter 28 and an adjacent, typically nylon inner filter 30. The filter assembly 27 is preferably capable of removing particles of up to typically about 100 microns in diameter or width which may break off from the various cooling system components, such as hoses and reservoirs, and enter the circulating coolant. As shown in FIG. 4, in the upper filter assembly 27, the outer filter 28 is typically located above the inner filter 30, whereas in the lower filter assembly 27a, the outer filter 28 is typically located below the inner filter 30.

As further shown in FIG. 4, the cation exchange resin beads 40 and the anion exchange resin beads 42 of the ion exchange bed 39 are packed between the inner filter 30 of the upper filter assembly 27 and the inner filter 30 of the lower filter assembly 27a. Preferably, the ion exchange bed 39 includes AMBERJET® UP6150 cation exchange resin beads 40 and anion exchange resin beads 42. These resins provide a stoichiometric equivalent exchange capacity and are capable of maintaining a low coolant conductivity, less than 5 μS/cm, over a three-month period during the removal of ions from a coolant in operation of the DI filter 10, as hereinafter described.

Figure 10:
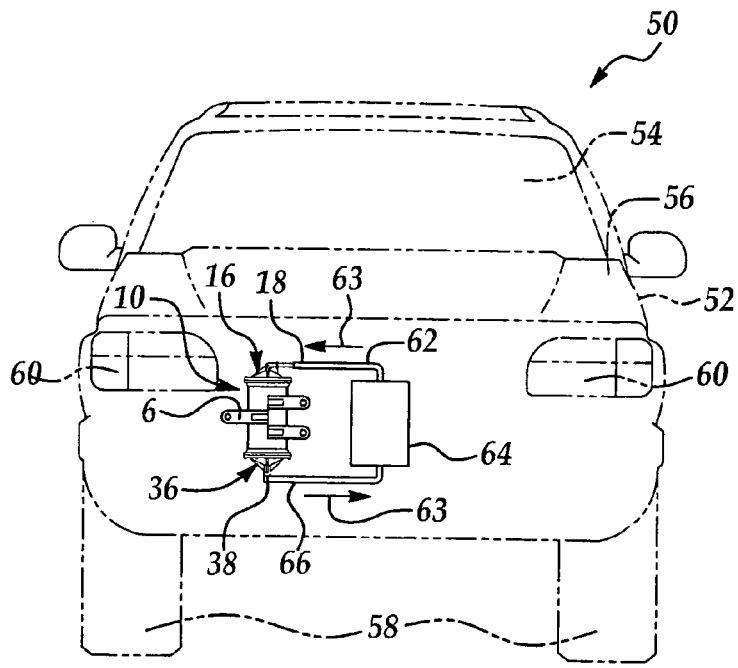
FIG. 10 is a front view of an electric fuel cell vehicle (shown in phantom), more particularly illustrating typical placement of the deionization filter (shown in solid lines) in an accessible location in the vehicle.

Referring next to FIG. 10, an illustrative fuel cell electric vehicle 50 is indicated in phantom in front view. The fuel cell electric vehicle 50 typically includes a chassis 52 and a cabin 54. The vehicle 50 typically includes four wheels, including a pair of spaced-apart front wheels 58, and headlights 60 at the front end of the chassis 52. A hood 56 is provided on the front end portion of the chassis 52 to provide access to the vehicle fuel cell motor (not shown) and other operational components of the vehicle 50.

In FIG. 10, the DI filter 10 of the present invention is shown in a typical packaged or installed configuration in the vehicle 50. Preferably, the DI filter 10 is installed in the vehicle 50 in an easily-accessible location, such as beneath the hood 56, for example. This can be accomplished, for example, by attaching the filter mount brackets 6 to the frame (not shown) or other structural elements of the vehicle 50. The DI filter 10 is also typically located in proximity to the vehicle cooling system 64, which may also be located beneath the hood 56 along with the fuel cell motor (not shown) and other operational components of the vehicle 10. A coolant inlet line 62 connects the vehicle cooling system 64 to the coolant inlet port 16 of the DI filter 10 to distribute a liquid coolant 63 to the coolant inlet port 16. A coolant outlet line 66 connects the coolant outlet port 36 of the DI filter 10 back to the cooling system 64 to return the filtered and de-ionized coolant 63 to the cooling system 64.

Referring again to FIGS. 4 and 10, in operation of the DI filter 10, ions (not shown) which inadvertently break loose from coolant distribution hoses, reservoirs and various other components (not shown) of the vehicle cooling system 64 and enter the coolant 63 during circulation of the coolant 63 through the system 64 are removed from the coolant 63. Accordingly, the coolant 63 is continually circulated from the vehicle cooling system 64 to the DI filter 10, through the coolant inlet line 62. From the coolant inlet line 62, the coolant 63 flows through the inlet conduit 18 and inlet port end cap interior 21 (FIG. 4), respectively, of the coolant inlet port 16; through the outer filter 28 and inner filter 30, respectively, of the upper filter assembly 27; and into the ion exchange bed 39 inside the filter housing 12. The outer filter 28 and inner filter 30 of the upper filter assembly 27 remove particulate debris such as particles which break loose from the transport hoses, reservoirs and various other components (not shown) of the vehicle cooling system 64. Preferably, the upper filter assembly 27 is capable of removing from the coolant 63 particles having a diameter or width of greater than typically about 100 micron.

As the coolant 63 trickles downwardly through the ion exchange bed 39, both under pressure from the flowing coolant 63 and by the assistance of gravity, the positively-charged cations (not shown) in the coolant 63 are bound by the negatively-charged cation exchange resin beads 40. Conversely, the negatively-charged anions (not shown) in the coolant 63 are bound by the positively-charged anion exchange resin beads 42. Finally, the descending coolant 63 reaches and passes through the lower filter assembly 27a into the outlet port end cap interior 21a, wherein the inner filter 30 and the outer filter 28 of the lower filter assembly 27a remove any remaining particulate matter, having a size of typically about 100 microns or greater, from the coolant 63.

From the outlet port end cap interior 21a, the de-ionized and filtered coolant 63 enters the outlet conduit 38 of the coolant outlet port 36. The coolant 63 is then transported back to the vehicle cooling system 64, which distributes the de-ionized and filtered coolant 63 through the fuel cell motor (not shown) of the vehicle 50. Accordingly, because most or all of the extraneous ions have been removed from the coolant 63, the coolant 63 has a substantially low electrical conductivity. Consequently, coolant-induced short-circuiting or electrical interference of the fuel cell motor in the vehicle 50 is prevented.

Figure 11:
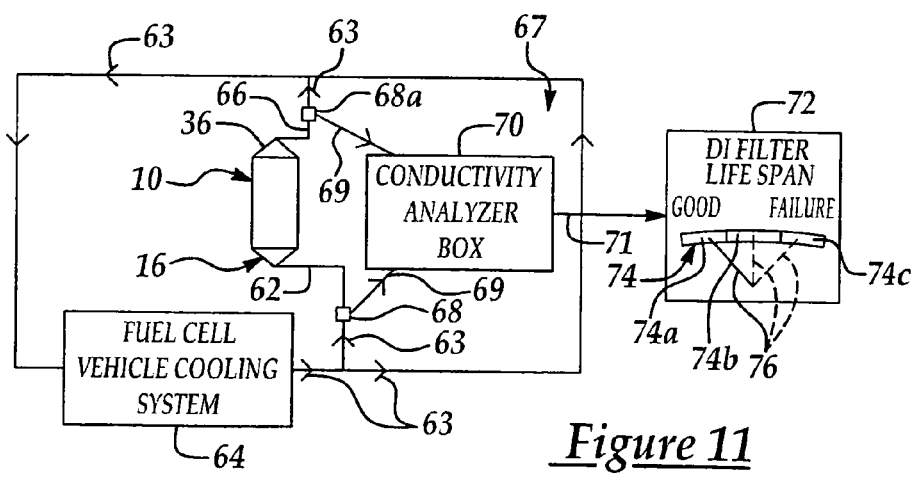
FIG. 11 is a schematic illustrating a typical flow of coolant from a fuel cell vehicle cooling system and through the deionization filter, and further illustrating a conductivity meter system for measuring the pre-filter and post-filter conductivity of the coolant and a visual indicator operably connected to the conductivity meter system for indicating the approximate remaining lifetime of the deionization filter.

Referring next to FIG. 11, a conductivity meter system 67 may be connected to the DI filter 10 to monitor and compare the pre-deionized and post-deionized conductivity of the coolant 63 before and after, respectively, the coolant 63 is distributed through the DI filter 10. The difference between the pre-deionized and the post-deionized conductivity of the coolant 63 provides a measure of the functional efficacy of the DI filter 10. The conductivity meter system 67 typically includes an inlet conductivity meter 68, which is provided in the coolant inlet line 62, and an outlet conductivity meter 68a, which is provided in the coolant outlet line 66. A conductivity analyzer box 70 is connected to the inlet conductivity meter 68 and the outlet conductivity meter 68a for receiving input 69 from the conductivity meters 68, 68a, respectively. The input 69 to the conductivity analyzer box 70 indicates the electrical conductivity of the coolant 63 in the coolant inlet line 62 versus the electrical conductivity of the coolant 63 in the coolant outlet line 66. The conductivity analyzer box 70 analyzes this difference, in coolant conductivity and determines whether the functional efficacy of the DI filter 10 is such that the DI filter 10 is removing ions from the coolant 66 at an optimum level, is rapidly losing ion-removing capacity, or is full of ions and requires replacement.

A visual meter 72, which may be provided on the dashboard (not shown) or in some other visible location typically inside the cabin 54 of the vehicle 50, is connected to the conductivity analyzer box 70. The conductivity analyzer box 70 transmits to the visual meter 72 input 71 which indicates the functional efficacy of the DI filter 10, as determined by the conductivity analyzer box 70 as described herein above. The visual meter 72 typically includes an elongated indicator bar 74 that is divided into a first segment 74a, a second segment 74b and a third segment 74c, which segments are separately-colored or otherwise visually distinct from each other. An indicator needle 76 provided on the visual meter 72 is capable of indicating one of the first segment 74a, second segment 74b and third segment 74c of the indicator bar 74, depending on the input 71 from the conductivity analyzer box 70.

On the visual meter 72, indication of the first segment 74a by the indicator needle 76 reveals a "good" operating condition of the DI filter 10, in which case the DI filter 10 is removing ions from the coolant 63 at an optimum level. Indication of the second segment 74b by the indicator needle 76 reveals a middle operating condition, in which the DI filter 10 is rapidly losing the capacity to remove ions from the coolant 63. Indication of the third segment 74c by the indicator needle 76 reveals a "service" condition, in which the DI filter 10 may be saturated with ions and thus require replacement. In that case, the driver (not shown) of the vehicle 50 can replace the ion-saturated DI filter 10 to ensure optimal removal of ions from the coolant 63 during continued operation of the vehicle 50.

While the preferred embodiments of the invention have been described above, it will be recognized and understood that various modifications can be made in the invention and the appended claims are intended to cover all such modifications which may fall within the spirit and scope of the invention.

What is claimed is:

1. In a vehicle having an electric fuel cell and coolant system, said coolant system including:
    a deionization filter including a housing having an inlet and an outlet, wherein a bed of negatively-charged cation and positively-charged anion exchange resin beads is contained within said housing, between the inlet and outlet;
    a pump;
    a thermal exchange device; and
    a coolant circulation network fluidically connecting said fuel cell, deionization filter, pump, and said thermal exchange device, said circulation network including:
        a coolant inlet line fluidically connected to said inlet; and
        a coolant outlet line fluidically connected to said outlet;
    the improvement comprising:
    a conductivity metering system including:
        an inlet conductivity meter provided in said coolant inlet line;
        an outlet conductivity meter provided in said coolant outlet line; and
        a conductivity analyzer box electrically connected to said inlet conductivity meter and said outlet conductivity meter for receiving signals from said meters;
    wherein, coolant is continuously circulated through said coolant system and through said deionization filter, where negative ions are removed from said coolant as it passes through said bed of negatively-charged cation and positively-charged anion exchange resin beads, the conductivity of coolant is measured before it enters said deionization filter using said inlet conductivity meter to obtain a first conductivity signal, the conductivity of coolant is measured after it exits said deionization filter using said outlet conductivity meter to obtain a second conductivity signal, and the difference in said first and second conductivity signals is computed in said conductivity analyzer box, to determine the functional efficacy of the deionization filter based on the difference in said first and second conductivity signals.

2. The vehicle of claim 1, wherein said deionization filter further comprises a first filter assembly provided adjacent to said inlet and a second filter assembly provided adjacent to said outlet.

3. The vehicle of claim 1, wherein said conductivity metering system further comprises a visual meter connected to said conductivity analyzer box.

4. The vehicle of claim 3, wherein said visual meter comprises an elongated indicator bar having a first segment indicating a condition requiring replacement of said ion exchange bed and a second segment indicating a condition comprising optimal operation of said ion exchange bed and an indicator needle responsive to indicate one of said first segment and said second segment based on said electrical conductivity difference.

* * * * *